United States Patent [19] … [11] Patent Number: 5,168,954
Nakaniwa et al. … [45] Date of Patent: Dec. 8, 1992

[54] APPARATUS FOR CONTROLLABLY SUCKING INTAKE AIR INTO EACH CYLINDER OF INTERNAL COMBUSTION ENGINE AND METHOD FOR CONTROLLING INTAKE AIR QUANTITY THEREOF WITH IMPROVED RESPONSIVE CHARACTERISTIC

[75] Inventors: Shinpei Nakaniwa; Junichi Furuya, both of Isezaki, Japan

[73] Assignee: Japan Electronic Control Systems Company, Limited, Isezaki, Japan

[21] Appl. No.: 682,083

[22] Filed: Apr. 9, 1991

[30] Foreign Application Priority Data

Apr. 9, 1990 [JP] Japan ................................. 2-92259

[51] Int. Cl.$^5$ ............................................. B60K 13/02
[52] U.S. Cl. ............................... 180/197; 364/426.02
[58] Field of Search .............. 180/197; 123/399, 442, 123/336, 339, 308; 364/426.02, 431.05, 431.07, 431.09

[56] References Cited

U.S. PATENT DOCUMENTS

| | | | |
|---|---|---|---|
| 4,294,205 | 10/1981 | Iiyama et al. | 123/336 X |
| 4,484,549 | 11/1984 | Yokoyama | 123/308 |
| 4,760,824 | 8/1988 | Sakurai | 123/339 |
| 4,765,430 | 8/1988 | Schulze et al. | 180/197 |
| 4,779,580 | 10/1988 | Rutschmann | 123/336 X |
| 4,811,808 | 3/1989 | Matsumoto et al. | 180/197 |
| 4,850,659 | 7/1989 | Rock et al. | 312/263 |
| 4,866,623 | 9/1989 | Ise et al. | 364/426.03 |
| 4,932,378 | 6/1990 | Hitomi | 123/308 X |
| 4,969,102 | 11/1990 | Tamura et al. | 364/426.03 |
| 5,054,446 | 10/1991 | Chuchi | 123/339 |

FOREIGN PATENT DOCUMENTS

| | | |
|---|---|---|
| 59-155543A | 9/1984 | Japan . |
| 63154827 | 12/1986 | Japan . |
| 63-201336 | 2/1987 | Japan . |
| 29948 | 6/1988 | Japan . |
| 1379478 | 3/1988 | U.S.S.R. . |

Primary Examiner—Robert P. Olszewski
Assistant Examiner—Dean A. Reichard
Attorney, Agent, or Firm—Foley & Lardner

[57] ABSTRACT

An apparatus for controllably sucking intake air into each cylinder of an internal combustion engine and method for controlling the intake air quantity of the internal combustion engine are disclosed in which, in an intake air passage, a first throttle valve associated with an acceleration element (accelerator pedal) is installed in a portion of the intake air passage located upstream of an intake manifold and a plurality of second throttle valves are installed in intake ports branched from the intake manifold whose opening angle is controlled by means of an actuator in response to a control signal input thereto. In addition, a bypass passage is connected between the intake air passage upstream of the first throttle valve and exits of the intake ports downstream of the second throttle valves to provide a swirl stream of the intake air sucked into each combustion chamber and a bypass intake air quantity control valve is installed in the bypass passage. Furthermore, a plurality of fuel injection valves are intervened in branched bypass passages located adjacent to the intake ports. The engine output control using the apparatus described above provides a faster responsive characteristic.

25 Claims, 5 Drawing Sheets

APPARATUS FOR CONTROLLABLY SUCKING INTAKE AIR INTO EACH CYLINDER OF INTERNAL COMBUSTION ENGINE AND METHOD FOR CONTROLLING INTAKE AIR QUANTITY THEREOF WITH IMPROVED RESPONSIVE CHARACTERISTIC

BACKGROUND OF THE INVENTION (1) Field of the Invention

The present invention relates to an apparatus for controllably sucking intake air into each cylinder of an internal combustion engine and a method for controlling intake air quantity of the internal combustion engine with improved responsive characteristic.

(2) Description of the Background Art

Recently, a generally called traction control system (TCS) has been put into practice which is provided with an auxiliary throttle valve installed within a throttle chamber of an intake air passage of a vehicular engine in series with a first throttle valve (installed within the throttle chamber) associated with an accelerator pedal, the auxiliary throttle valve being driven by means of an electric motor which pivots the auxiliary throttle valve in response to a control signal.

The traction control system further includes a first sensor for detecting a rotational speed of each driven tire wheel of the vehicle, a second sensor for detecting a rotational speed of each non-driven (steered) tire wheel, and calculation means for calculating a difference between both rotational speeds of the driven and non-driven wheels to monitor a slip condition. Then, the traction control system controls an opening angle of the auxiliary throttle valve toward a closed position when the slip condition appears so that the engine output is reduced, and an excessive intake air quantity caused by the instantaneous opening angle of the first throttle valve is throttled by means of the auxiliary throttle valve.

Such a traction control system as described above is exemplified by U.S. Pat. Nos. 4,850,659, 4,811,808, 4,765,430, and 4,969,102.

In order to cope with a recent trend of requiring a low fuel consumption rate for the vehicular engine, a control system having an increased Exhaust Gas Recirculation rate (EGR) and/or an air/fuel mixture ratio which is controlled to become leaner, has been proposed.

However, if the controls for increasing the EGR rate and/or making the air/fuel mixture ratio leaner are executed, a surge, i.e., a low frequency vibration of a vehicle body in the forward and rearward directions during a cruise run or during a vehicle acceleration/deceleration due to an unsmooth operation of the vehicular engine, can occur easily.

If the surge were absorbed and eliminated by the opening angle control of the auxiliary throttle valve in the traction control system described above, the surge could be avoided and, on the other hand, a low fuel consumption rate could be achieved through the leaner air/fuel mixture ratio.

However, such a traction control as described above has an adverse effect on the engine output characteristic. That is to say, even if the surge, having a frequency range from 1 Hz to 10 Hz which is absorbed through an occupant of the vehicle, is absorbed through the opening angle control of the auxiliary throttle valve, the responsive characteristic of the engine output to the controlled opening angle of the auxiliary throttle valve is poor due to an inherent presence of a collector (intake manifold which is chamber) capacity in an intake manifold provided at a downstream portion of the auxiliary throttle valve. Therefore, the surge cannot sufficiently be absorbed in the above-described traction control system.

In addition, in an engine output control using the traction control system such that the engine output is reduced when the slip condition occurs, the traction on the wheels of the vehicle cannot speedily recover due to the presence of a response delay to the controlled opening angle of the auxiliary throttle valve in the engine output. The response delay being caused by the presence of the collector capacity described above.

Although the auxiliary throttle valve can be used to control the engine output, irrespective of the opening angle of the first throttle valve controlled in association with the accelerator pedal operation, such that the engine output is once reduced during a gear shift (for example, gear range up-shift from a third gear range to a fourth gear range) of a gear range of a vehicular power transmission associated with the engine in order to reduce or relieve a shock occurred during the gear shift operation, the responsive characteristic of the engine output to the controlled opening angle control of the auxiliary throttle valve is poor. It is desirable and necessary to improve such a poor responsive characteristic if such an engine output control system is put into practice.

Furthermore, in a case where an opening angle of an idling speed control valve, intervened in a bypass passage bypassing the first and auxiliary throttle valves, is controlled so that an engine idling revolutional speed is matched with a target idling revolutional speed in a feedback control mode, the intake air supplied via the bypass passage is once filled in the intake manifold collector portion and, then, sucked into the engine.

Therefore, a response delay also occurs during idling speed control through the idling speed control valve in the same way as the response delay in the engine output control through the auxiliary throttle valve occurs due to the presence of the collector capacity.

SUMMARY OF THE INVENTION

It is, therefore, an object of the present invention to provide an apparatus for controllably sucking intake air into each cylinder of an internal combustion engine and a method for controlling the intake air quantity of the internal combustion engine which can follow up an output control requirement (intake air quantity control requirement) with a faster responsive characteristic, the output control requirement being regardless of a displacement of an accelerator pedal.

The intake air sucking apparatus and its controlling method can improve the responsive characteristic of a surge absorption control, traction control, feedback control of the engine idling speed, and gear shift shock reduction control.

The above-described object can be achieved by providing: an apparatus for an internal combustion engine having a number of engine cylinders, comprising: a) an intake manifold having a plurality of branched intake ports associated with intake valves of the respective engine cylinders for defining an intake air passage; b) a first throttle valve associated with an accelerator element for controllably opening and closing the intake air passage, the first throttle valve being controlled in accordance with an operation on the acceleration element and installed on an upstream portion of the intake manifold; and c) a plurality of second throttle valves installed on the intake ports of the intake manifold and whose opening angles are controlled by means of an actuator in response to a control signal input thereto.

The above-described object can also be achieved by providing: a controlling apparatus for an internal combustion engine, comprising: a first throttle valve associated with an accelerator element for controllably opening and closing an intake air passage of the engine, the first throttle valve being controlled in accordance with an operation on the acceleration element and installed on an upstream portion of the intake manifold; a plurality of second throttle valves installed on the intake ports of the intake manifold and whose opening angles are integrally controlled by means of an actuator in response to a control signal input thereto: a bypass passage having a plurality of branched bypass passages at an intermediate portion of the bypass passage, one end of the bypass passage being connected to the intake air passage at an upstream portion of the first throttle valve and the other ends of the branched bypass passages being connected to the intake ports downstream of the second throttle valves; a bypass intake quantity control valve intervened in the bypass passage for controlling the intake air quantity passed through the bypass passage in response to another control signal input thereto; a first sensor for monitoring a camshaft rotation and for producing a reference crank angle signal whenever a piston of each cylinder reaches a top dead center; first means for deriving and updating a TDC period whenever the reference crank angle signal is received; second means for deriving an engine revolutional speed on the basis of the TDC period, deriving a two-order differential value of the engine revolutional speed, and deriving a determination value to determine whether a surge of a vehicle body in which the engine is mounted occurs on the basis of the differential value of the engine revolutional speed; and third means for producing and outputting the control signal to at least one of the actuator or bypass intake air quantity control valve for controlling opening angle of at least one of the second throttle valve or bypass intake air quantity control valve so as to give zero to the two-order differential value of the engine revolutional speed.

The above-described object can also be achieved by providing a controlling system for an internal combustion engine, comprising the steps of: a) providing a plurality of auxiliary throttle valves in intake ports branched from an intake manifold in addition to a first throttle valve installed in an upstream portion of the intake manifold; b) providing a bypass passage between an intake air passage upstream of the first throttle valve and the intake ports and a bypass intake air quantity control valve intervened in the bypass passage; and c) controlling at least one of an opening angle of the auxiliary throttle valves and bypass intake air control valve to control an intake air quantity supplied to the engine.

DETAILED DESCRIPTION OF THE PREFERRED EMBODIMENT

Reference will hereinafter be made to the drawings in order to facilitate a better understanding of the present invention.

Figure 1:
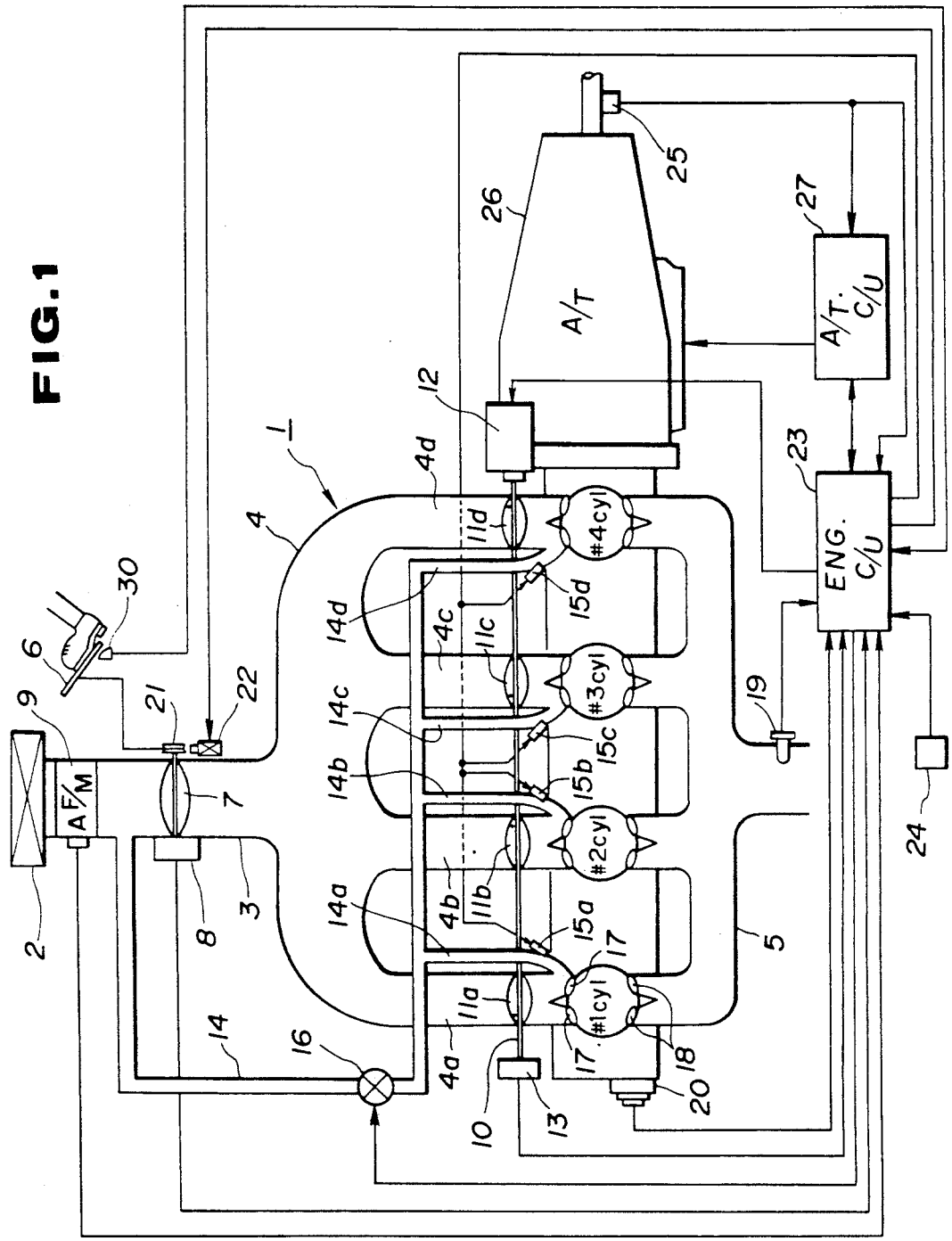
FIG. 1 is a schematic circuit block diagram of an apparatus for sucking intake air into each engine cylinder of an internal combustion engine associated with a vehicular power transmission in a preferred embodiment according to the present invention.

FIG. 1 shows a preferred embodiment of an apparatus for sucking intake air into each engine cylinder of an internal combustion engine associated with an automatic power transmission according to the present invention.

In FIG. 1, the internal combustion engine 1 is a four-cylinder, four-stroke engine. Intake air is sucked through an air cleaner 2, a throttle chamber 3, and an intake manifold 4 into a combustion chamber of each engine cylinder. Exhaust gas emitted from each combustion chamber is passed through an exhaust manifold 5.

A first throttle valve 7 is installed within the throttle chamber 3, the first throttle valve 7 being a butterfly type whose opening angle is controlled according to a depression force on an accelerator pedal 6 of a vehicle. A first throttle sensor 8 constituted by a potentiometer detects an opening angle TV01 of the first throttle valve 7. An airflow meter 9 for detecting an intake air quantity Q of the engine is installed at an upper stream portion of the first throttle valve 7.

It is noted that a plurality of second butterfly throttle valves 11a through 11d are installed in intake ports 4a through 4d which are branched from the intake manifold 4. The second throttle valves 11a through 11d are provided with an integral throttle shaft 10 on which the butterfly second throttle valves 11a through 11d are pivoted by means of a servo motor 12.

The servo motor 12, acting as an actuator, is provided to actuate the second throttle valves 11a through 11d, via the throttle shaft 10 thereby pivoting the second throttle valves 11a through 11d through a given angle. It is noted that one end of the throttle shaft 10, which is opposite to servo motor 12, is provided with a second throttle sensor 13, constituted by another potentiometer a for detecting an opening angle TV02 of the second throttle valves 11a through 11d.

The servo motor 12 is provided with a spring mechanism which biases the second throttle valves 11a through 11d toward a completely open direction. When the servo motor 12 fails, the spring mechanism acts to open the second throttle valves 11a through 11d to provide a fail-safe structure for the first throttle valve 7.

In addition, a bypass passage 14 is branched from upstream of the first throttle valve 7. The bypass passage 14 is, then, branched into four bypass passages 14a through 14d at respective downstream portions of the intake ports 4a through 4d. The bypass passage 14 serves to bypass the first throttle valve 7 and the second throttle valves 11a through 11d, to directly introduce atmospheric air into the respective engine cylinders.

It is noted that an open position and open direction of the respective intake ports are set so that the air introduced from the bypass passages 14a through 14d into the intake ports 4a through 4d is supplied to the respective combustion chambers in the form of a swirl stream.

Electromagnetic fuel injection valves 15a through 15d are installed on predetermined positions of the intake ports 4a through 4d adjacent to the exit of the respective bypass passages 14a through 14d.

An electromagnetic bypass airflow quantity control valve 16, which controls the bypass airflow quantity in the bypass passage 14 according to a duty ratio of the input control signal, is installed in a position before (upstream of) the branched bypass passages 14a through 14d.

As described above, since the fuel injection valves 15a through 15d are installed on the bypass passages 14a through 14d so as to face toward the intake valves of the respective cylinders, almost all fuel supplied from the fuel injection valves 15a through 15d is remarkably atomized in the air stream having a high fluid velocity, as compared with the case where the fuel injection valves are installed on the intake air ports 4a through 4d.

It is noted that the intake air supplied via the respective intake ports 4a through 4d and via the bypass passages 14a through 14d is introduced into the respective combustion chambers via the intake valves 17 (in this embodiment, two intake valves are installed). The exhaust gas emitted through two exhaust valves 18 of each cylinder is exhausted to an exhaust manifold 5. An integrated passage of the exhaust manifold 5 is provided with an oxygen sensor 19 for detecting an air/fuel mixture ratio of air mixture fuel supplied to the engine from an oxygen concentration of the exhaust gas. The detected signal of the oxygen sensor 19 is supplied to an engine control unit (ENG. C/U) 23 so that the actual air/fuel mixture ratio is feedback controlled to coincide with a target air/fuel mixture ratio (stoichiometric air/fuel mixture ratio).

A camshaft associated with an engine crankshaft (not shown) is provided with a cam sensor 20 for detecting an engine crankshaft rotational angle. The cam shaft sensor 20 outputs a reference angle signal REF whenever each piston of the cylinders reaches a top dead center (TDC).

In addition, an electromagnetic valve 22 is installed in an accelerator drum 21 to open the first throttle valve 7 through a predetermined angle with no depression force imposed on an accelerator pedal 6 when it is energized.

The engine control unit 23 executes controls over the servo motor 12, bypass intake air quantity control valve 16, fuel injection valves 15a through 15d, and electromagnetic valve 22. The control unit 23 receives the detected signals derived from the first throttle sensor 8, airflow meter 9, second throttle sensor 13, oxygen sensor 19, cam sensor 20, and so forth.

In addition, a front wheel rotational speed sensor 24 is installed for detecting a rotational speed of a front wheel, and a rear wheel (driven wheel) rotational speed sensor 25 is installed for detecting a rotational speed of a rear wheel. The control unit 23 receives the detected signals derived from the respective rotational speed sensors 24 and 25.

It is noted that the front wheel and rear wheel rotational speed sensors 24, 25 are exemplified by a U.S. Pat. No. 4,866,623 issued on Sep. 12, 1989 (a disclosure of which is herein incorporated by reference).

An output axle of the engine 1 is connected to an automatic transmission (A/T) 26 via a torque converter. The automatic transmission is provided with a self-contained control unit 27.

The control unit 27 receives the detected signal derived from the rear wheel rotational speed sensor 25 to detect the vehicle speed, a gear speed range select signal derived from an inhibitor switch installed on a select lever (not shown), and the detected signal of an operating variable of accelerator pedal 6 derived from an acceleration sensor 30.

The control units 23 for the engine and 27 for the automatic transmission (A/T) are mutually communicable.

Each control unit 23 and 27 generally consists of a CPU, ROM, RAM, and I/O interface.

FIGS. 2 to 6 show program flowcharts for explaining the operation of the intake air sucking apparatus in the preferred embodiment according to the present invention.

Figure 2:
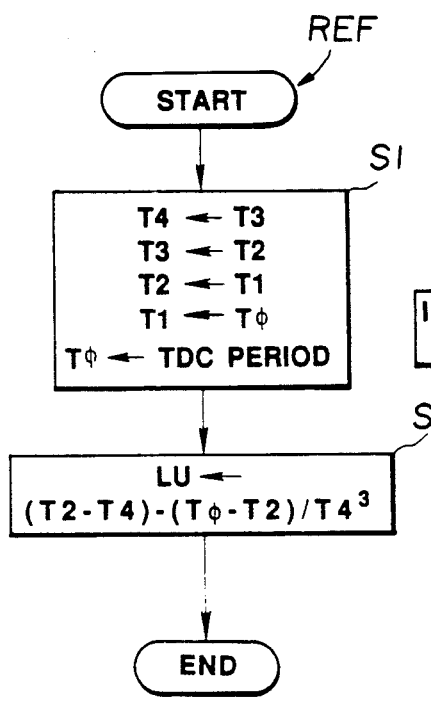
FIG. 2 is a first operational flowchart executed by an engine control unit of the intake air sucking apparatus shown in FIG. 1.

FIG. 2 is a first program flowchart executed by the control unit 23 which is started in response to the output of the reference angle signal REF from the cam sensor 20 whenever each piston of the cylinders reaches the top dead center (TDC).

In a step S1, a TDC period derived as an output interval from a previously derived reference angle signal REF to a currently derived reference angle signal REF is stored on a time series basis.

Specifically, the last measured TDC period is set to T0 and the TDC period set as T0 during the previous execution of the program of FIG. 2 is set to T1 as one previous data. Similarly, the previously derived TDC period data T1, T2, and T3 are respectively set to T2, T3, and T4 as one previous data. Thus, the TDC period from the latest TDC period to the oldest TDC period, i.e., before TDC periods of four previous times (before engine two revolutions) is set.

A determination value LU indicating a magnitude of irregular driving condition is calculated using the above-described TDC period in accordance with the following equation:

$$LU = \frac{(T2 - T4) - (T0 - T2)}{T4^3 \text{ (or } T2^3 \text{ or } T0^3)}$$

In the above equation, a numerator indicates a two-order differential value of the TDC period T (engine revolutional speed) and is calculated to be approximately zero provided that an acceleration in a change of the period T is constant.

The numerator indicates a plus value when the acceleration of the vehicle body is increased and a minus value when the acceleration thereof is decreased.

If, hence, the engine output is controlled so as to suppress variations of the value of (T2−T4)−(T0−T2) with a zero as a center, the vehicle acceleration (a first-order differential value of the TDC period) of the period T (engine revolutional speed) can be maintained constant.

Consequently, since the surge can be absorbed, the engine intake air quantity can be controlled on the basis of the determination value LU as will be described later.

If the second-order differential value of the TDC period T is divided by a cubic value of the TDC period T, the determination value LU is correlated to a variation in a mean effective pressure between each cylinder.

When the intake air quantity is controlled in a direction in which the value of (T2−T4)−(T0−T2) approaches zero, a controlled variable is determined according to the determination value LU.

Control can be simplified since it is not necessary to variably set the controlled variable for each driving condition.

Figure 3A:
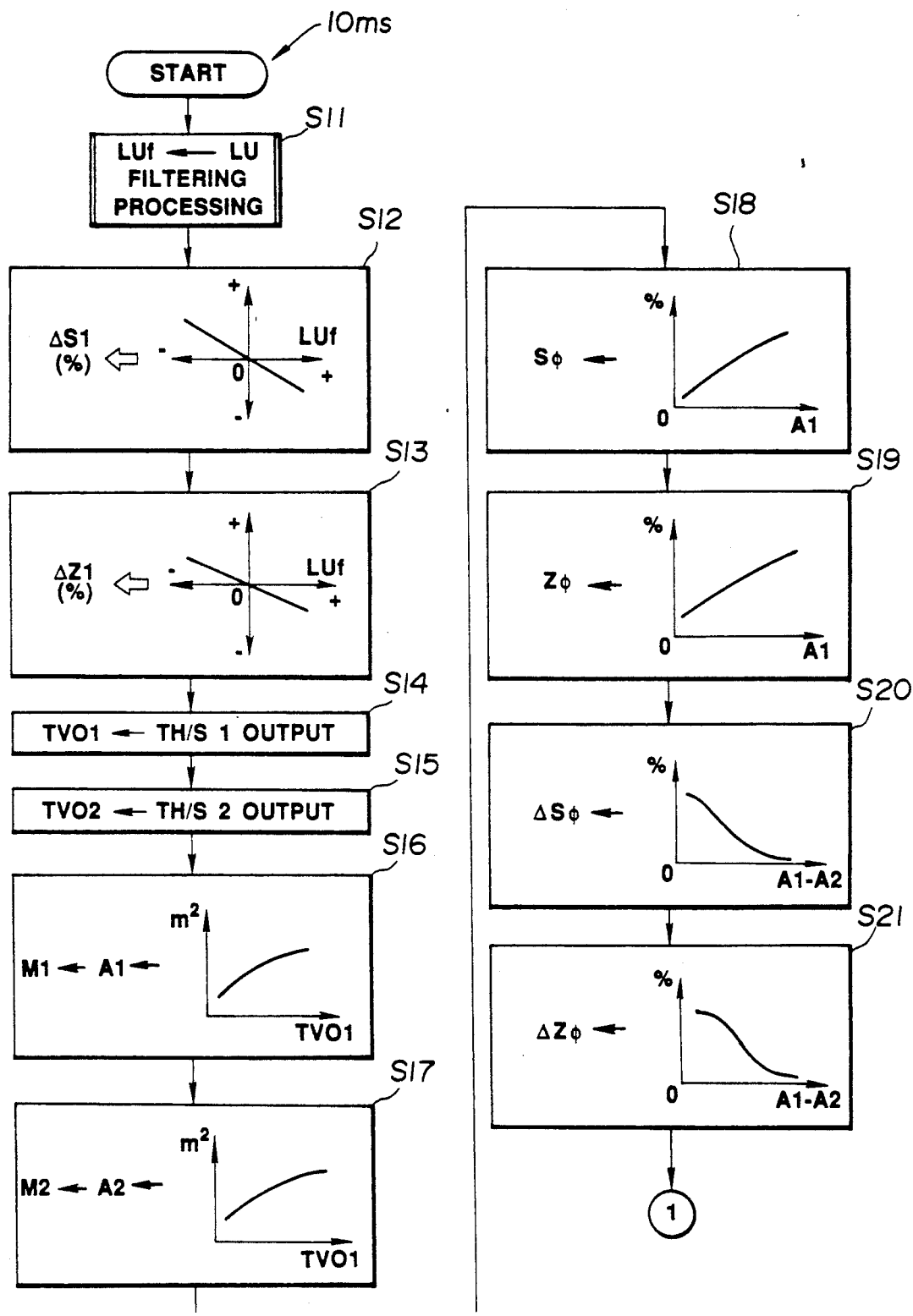
FIGS. 3 (A) and 3 (B) are integrally a second operational flowchart executed by the engine control unit of the intake air sucking apparatus shown in FIG. 1.
Figure 3B:
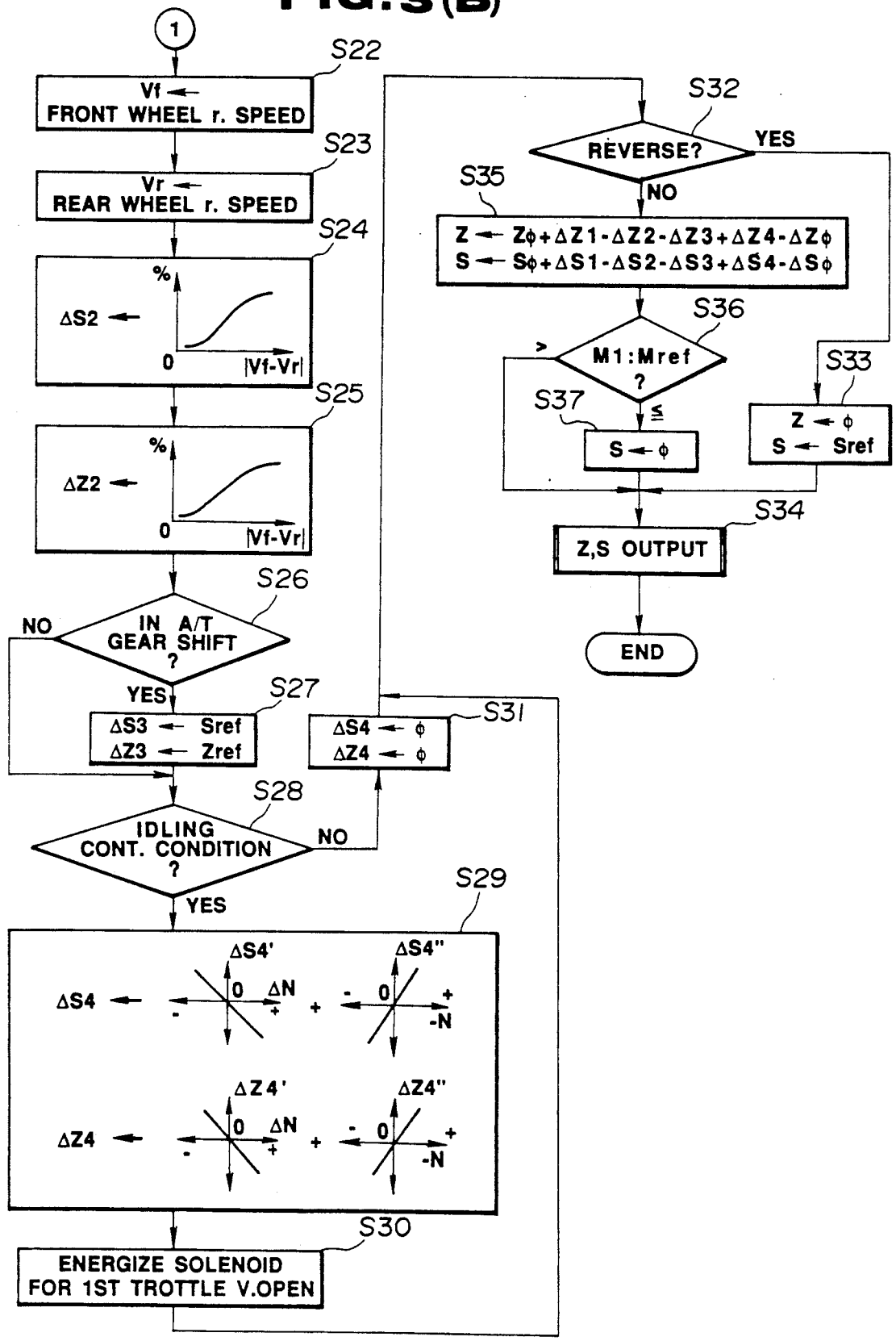

A program flowchart shown in FIGS. 3 (A) and 3 (B) is executed by the control unit 23 whenever a predetermined period of time is elapsed.

In a step S11, the determination value LU calculated in the program flowchart shown in FIG. 2 is passed through a software band-pass filter to take out a component having a predetermined frequency range (e.g., 1 to 10 Hz), in the frequency range of which a vehicular occupant perceives the surge. The component is set as LUf.

In a step S12, a correction coefficient $\Delta S1$ of the opening angle of the second throttle valves 11a through 11d to absorb the surge is searched from a map on the basis of the value of LUf set in the step S11.

In a step S13, a correction coefficient $\Delta Z1$ of the opening angle of the bypass intake air quantity control valve 16 is searched from a map on the basis of the value of LUf set in the step S11.

It is noted that both of the correction coefficients $\Delta S1$ and $\Delta Z1$ are set to indicate minus (plus) values when the value of LUf indicates a plus (minus) value.

Thus, if the acceleration is increased (decreased), the intake air quantity is decreased (increased). Consequently, the intake air quantity is correctively controlled so that the acceleration of the engine revolutional speed is fixed to be constant and the surge is absorbed. That is to say, when the acceleration of the engine revolutional speed is changed at the frequency perceived by the vehicular occupant, the opening angles of the second throttle valves 11a through 11d and of the bypass intake air flow control valve 16 are controlled independently of the first throttle valve 7.

In a step S14, the CPU of the control unit 23 sets the opening angle TV01 of the first throttle valve 7 detected by the first throttle sensor 8.

In a step S15, the opening angle TV02 of the second throttle valves 11a through 11d is set detected by the second throttle sensor 13.

In a step S16, the CPU of the control unit 23 converts the opening angle TV01 of the first throttle valve 7 set in the step S14 into an opening area (m$^2$) of the throttle chamber 3 by searching a map. The derived opening area is set as A1 and M1, respectively. M1 will be described later.

In a step S17, the opening angle TV02 of the second throttle valves 11a through 11d set in the step S15 is converted into an opening area (m$^2$) of each intake air port 4a through 4d. The opening area is set as A2 and M2.

In a step S18, a basic opening angle S0 of the second throttle valves 11a through 11d is set by searching a map on the basis of the opening area A1 of the first throttle valve 7 derived in the step S17.

As the opening angle of the first throttle valve 7 is increased, the basic opening angle S0 of the second throttle valves 11a through 11d is accordingly increased.

In the next step S19, the CPU searches a basic opening angle Z0 of the bypass intake air quantity control valve 16 from a map on the basis of the opening angle A1 of the first throttle valve 7.

As the opening angle A1 is increased, the basic opening angle Z0 is set to a larger value. Since the air drived from the bypass passage 14 generates a swirl in the corresponding combustion chamber, a quantity of swirl is increased according to the increase in the engine load.

In a step S20, a decrease correction coefficient $\Delta S0$ of the opening angle of the second throttle valves 11a through 11d is set according to a result of subtraction of the opening area A2 from the opening area A1.

The value of $\Delta S0$ is set to a larger value as the difference between A1 and A2 becomes minor so that the opening angle of the second throttle valves 11a through 11d is further throttled. Consequently, the opening area A2 becomes smaller than that area A1. Hence, the intake air quantity can be controlled with fast a characteristic by the opening angle control of the second throttle valves 11a through 11d.

In a step S21, the value of $\Delta Z0$ as a decrease correction coefficient of the opening angle of the bypass intake air quantity control valve 16 is set according to a difference value of the opening area A2 from the opening area A1 (A1−A2). The value of $\Delta Z0$ is set to a larger value as the difference between A1 and A2 becomes minor. Thus, the opening angle of the bypass intake airflow intake quantity control valve 16 is decreased as the opening angle of the second throttle valves 11a through 11d becomes substantially equal to that of the first throttle valve 7.

In a step S22, the CPU of the control unit 23 sets the rotational speed of the front wheel (non-driven wheel) detected by the front wheel rotational speed sensor 24 to Vf.

In a step S23, the CPU sets the rotational speed of the rear wheel (driven wheel) detected by the rear wheel speed sensor 25 to Vr.

In a step S24, the CPU calculates an absolute value of a difference between values of Vr and Vf, i.e., $|Vf-Vr|$ and sets $\Delta S2$ as the decrease correction coefficient of the opening angle of the second throttle valves 11a through 11d.

Since as the value of $|Vf-Vr|$ becomes large, the slip rate of the wheels is increased, the intake air quantity is reduced to reduce the engine output to recover the vehicular traction when $|Vf-Vr|$ indicates a large value.

As the value of $|Vf-Vr|$ indicates the large value, the value of $\Delta S2$ is set to a larger value, thereby reducing the opening angle of the second throttle valves 11a through 11d.

In a step S25, the correction coefficient for reducing the opening angle $\Delta Z2$ to reduce the bypass intake air quantity control valve 16 in the slip condition is set on the basis of the value of $|Vf-Vr|$, in the same way as $\Delta S2$.

The control procedure from the steps S22 to S25 serves to execute opening angle controls over the second throttle valves 11a through 11d and bypass flow quantity control valve 16, simultaneously.

In a step S26, the CPU of the control unit 23 inquires the CPU of the control unit 27 to determine whether the gear shift operation is carried out in an automatic transmission 26. During the gear shift operation in the automatic transmission 26, the routine goes to a step S27 in which a first predetermined value Sref is set to ΔS3 and a second predetermined value Zref is set to ΔZ3 so that a gear shift shock is relieved with the engine output reduced during the gear shift operation. Thus, during the gear shift operation, the second throttle valves 11a through 11d and bypass intake airflow quantity control valve 16 are throttled (the opening angles thereof are reduced) by the predetermined values Sref and Zref, respectively, to reduce the engine output.

In a step S28, the CPU of the control unit 23 determines whether a condition under which the engine idling speed is feedback controlled to coincide with the target idling speed is satisfied.

The feedback control condition described above, for example, includes a state in which the first throttle valve 7 is an opening angle in the vicinity to the fully closed condition and the transmission 26 is in a neutral state or the vehicle speed is below a predetermined speed.

If the engine idling condition is satisfied, the routine goes to a step S29 in which a correction coefficient ΔS4 and correction coefficient ΔZ4 for increasing or decreasing the opening angles of the second throttle valves 11a through 11d and the bypass intake air quantity control valve 16 are set in order to perform the feedback control of the engine idling speed to make coincidence with the target idling speed.

It is noted that the engine revolutional speed N can be derived from the TDC period derived in the step S1 and, in the step S29, the correction coefficients ΔS4' and ΔZ4' derived according to a first-order differential value ΔN (acceleration) of the engine revolutional speed N are set, correction coefficients ΔS4" and ΔZ4" derived according to a value of subtraction of the actual engine revolutional speed N from the target vehicle speed are set, and ΔS4 and ΔZ4 are set as the addition values of ΔS4'+ΔS4" and ΔZ4'+ΔZ4", respectively.

Then, the correction coefficients ΔS4' and ΔZ4' are set as minus values when ΔN indicates a plus value and the engine idling speed is increased so that the engine idling speed is settled.

In addition, the correction coefficients ΔS4", ΔZ4" are set as plus values when the difference between the target idling speed and actual idling speed indicates a plus value and thereby the actual idling speed is below the target idling speed.

Hence, the correction coefficients ΔS4' and ΔZ4' serve to correct the engine idling speed in a direction in which the engine idling speed is settled and the correction coefficients ΔS4" and ΔZ4" serve to correct the engine idling speed in a direction in which the actual idling speed approaches the target idling speed. In addition, since as the change (ΔN) in the revolutional speed becomes large and as the actual idling speed change with respect to the target idling speed is large, a large opening angle correction quantity is set so that a converging characteristic to the target idling speed is preferable and fast.

In a step S30, when the values of ΔS4 and ΔZ4 to execute the idling speed feedback control are set in the step S29, the electromagnetic valve 22 is energized so that the first throttle valve 7 is slightly opened in an opening angle through which the engine is determined to fall in the idling condition. The reason that the first throttle valve 7 is slightly opened will be described below. That is to say, if the intake air is introduced via the first throttle valve 7, the second throttle valves 11a through 11d can control the intake air quantity during the engine idling.

On the other hand, if, in the step S28, no engine idling is satisfied (NO), the routine goes to a step S31 in which both correction coefficients ΔS4 and ΔZ4 are set to zero, respectively.

In a step S32, the CPU of the control unit 23 inquires the CPU of the control unit 27 to determine whether the present gear range falls in a reverse gear range in the automatic transmission 26.

If the gear range falls in the reverse range (R), the routine goes to a step S33 in which zero (0) is set to a final opening angle control value Z of the bypass intake airflow quantity control valve 16 in order to close the bypass airflow quantity control valve 16 so as to interrupt the air introduction via the bypass passage 14. On the other hand, a predetermined value is set to a final control value S for the opening angles of the second throttle valves 11a through 11d. The second throttle valves 11a through 11d are controlled to provide predetermined opening angles.

Hence, during the reverse gear range position, the intake air quantity is limited due to the predetermined opening angles of the second throttle valves 11a through 11d although the first throttle valve 7 is open so that the engine output is reduced.

In a step S34, a control signal having a duty ratio according to the opening angle control values Z and S is supplied to the bypass intake airflow quantity control valve 16 and servo motor 12 in order to control the bypass air quantity control valve 16 and second throttle valves 11a through 11d on the basis of the opening angle control values Z and S finally set in the step S33.

If the gear range of the automatic transmission does not fall in the reverse range (R), the routine goes to a step S35 in which the final opening angle control values Z and S as a total of the basic control values and correction coefficients set according to the respective control requirements in the respective steps are calculated in accordance with the following equations:

$$Z \rightarrow Z0 + \Delta Z1 - \Delta Z2 - \Delta Z3 + \Delta Z4 - \Delta Z0$$

$$S \rightarrow S0 + \Delta S1 - \Delta S2 - \Delta S3 + \Delta S4 - \Delta S0$$

The values of Z0 and S0 indicate basic control values determined according to the opening angle of the first throttle valve 7. The values of ΔZ1 and ΔS1 denote increase or decrease correction coefficients set on the basis of the two-order differential values of the TDC period in order to absorb the surge. The values of ΔZ2, ΔS2 indicate decrease correction coefficients to reduce the engine output torque during the gear shift operation to prevent the occurrence of shift shock. The values of ΔZ4 and ΔS4 indicate increase and decrease correction coefficients for the idling speed to be feedback controlled toward the target idling speed. The values of ΔZ0, ΔS0 indicate decrease correction coefficients to reduce the opening angle of the second throttle valves and bypass intake air quantity control valve 16 in order to improve the control of the intake air quantity by means of the bypass intake air quantity control valve 16 and the second throttle valves 11a through 11d when the opening area A1 of the first throttle valve 7 and the opening area A2 of the second throttle valves 11a through 11d approach each other.

As described above, the opening angles of the second throttle valves 11a through 11d and bypass airflow quantity control valve 16 are controlled in response to the respective control requirements and the second throttle valves 11a through 11d are installed on the respective intake ports 4a through 4d. Therefore, the intake air quantity (engine output) can be controlled with fast responsive characteristic by opening or closing the second throttle valves 11a through 11d.

A quick response to the respective requirements for the variation in the engine output torque, which is not correlated to the accelerator operation, such as the recovery of traction and engine output reduction requirement to relieve the shift shock can be achieved and the controllability can be improved. In addition, control of the engine to absorb the high frequency surge can be executed. Thus, generation of surge due to the controlled lean air/fuel mixture ratio and increased EGR can be suppressed by means of the engine output control.

In a step S36, the CPU compares a predetermined value M1ref which corresponds to a minimum opening area when the second throttle valves 11a through 11d are completely closed with the value of M1 in which the opening area A1 of the first throttle valve 7 is set. If M1 is less than the predetermined value M1ref (M1≦M1ref), the routine goes to a step S37 in which zero is set to the opening angle control value of S. This is because when the opening areas of the second throttle valves 11a through 11d which are completely closed are larger than that of the first throttle valve 7, the intake air quantity passing through the first throttle valve 7 cannot be controlled. At this time, only the intake air quantity supplied through the bypass passage 14 is controlled by means of the bypass intake air quantity control valve 16.

It is noted that even though the intake air quantity is increased or decreased only through the bypass passage 14, the air passed via the bypass passage 14 is not filled in the collector of the intake manifold 4 but directly supplied into the intake ports 4a through 4d. Thus, the responsive characteristic of the intake air quantity control is very good and the recovery speed of the idling speed can be assured.

Figure 4:
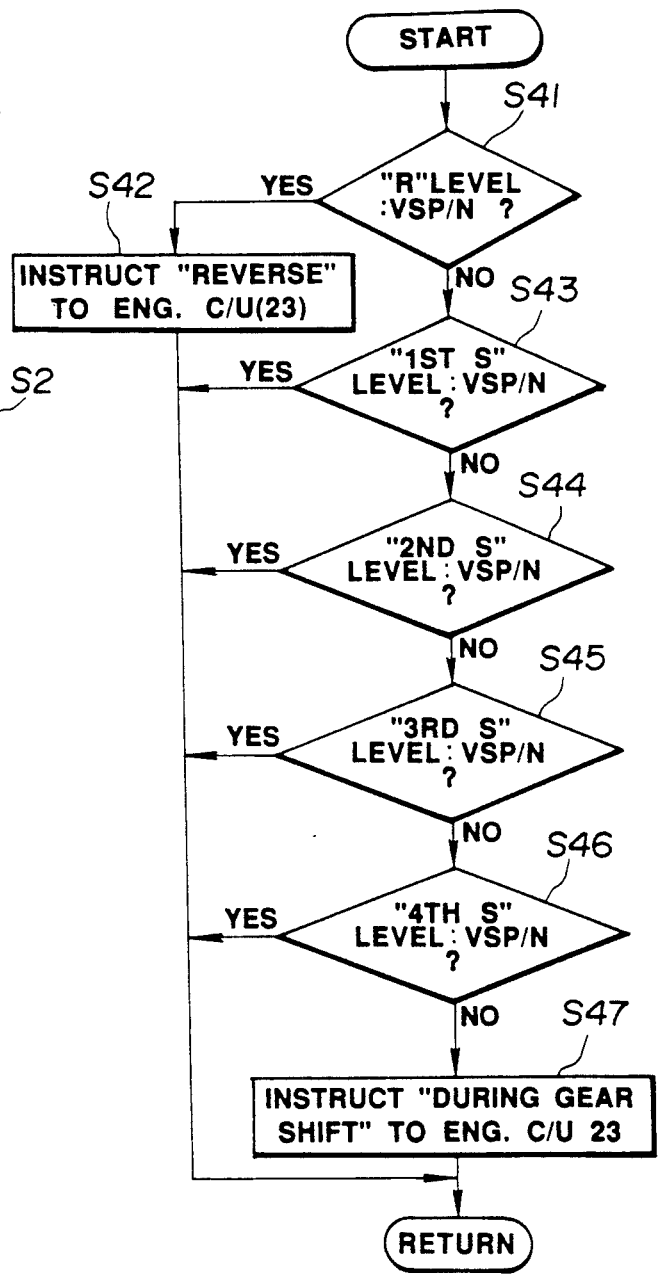
FIG. 4 is a third operational flowchart executed by an automatic transmission control unit of the intake air sucking apparatus shown in FIG. 1.

FIG. 4 shows an operational flowchart executed by the control unit 27 for the automatic transmission 26.

In FIG. 4, the control unit 27 detects the gear range position and shift operation on the basis of the vehicle speed derived from a final drive gear ratio and engine revolutional speed.

In a step S41, the CPU of the control unit 27 determines whether a value of vehicle speed VSP/engine revolutional speed N corresponds to a reverse gear ratio.

If the value corresponds to the reverse gear ratio, the routine goes to a step S42 in which the CPU outputs an instruction signal indicating that the gear range falls in the reverse gear range to the CPU of the control unit 23. Then, upon receipt of the instruction signal, the CPU of the control unit 23 carries out the determination in the step S32.

If the CPU of the control unit 27 determines that the gear range does not fall in the reverse gear range, the routine goes to steps S43 through S46 to determine if the gear range falls in one of the first speed range, second speed range, third speed range, or fourth gear range by comparing the level with VSP/N.

If the value of VSP/N does not fall in any one of the gear ranges, the routine goes to a step S47 in which the CPU of the control unit 27 outputs another instruction signal to the control unit 23 indicating that the transmission is in the gear shift operation. The control unit 23, upon receipt of the instruction signal, executes the determination step of S26.

Figure 5:
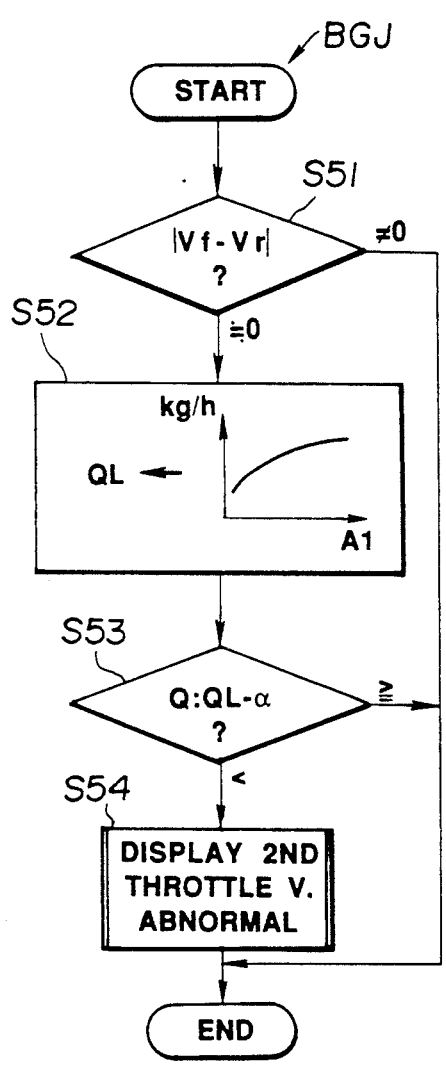
FIG. 5 is a fourth operational flowchart executed by the engine control unit of the intake air sucking apparatus shown in FIG. 1.

FIG. 5 shows a program flowchart executed by the control unit 23 as a background job.

In a step S51, the CPU of the control unit 23 determines whether a rotational speed difference between the front wheels and rear wheels |Vf−Vr| is present, i.e., a slip condition occurs.

If no slip condition occurs, the engine output reduction control with the second throttle control valves 11a through 11d and bypass intake air quantity control valve 16 is not executed, and the routine goes to a step S52.

In a step S52, the intake air quantity QL derived from the opening area A1 of the first throttle valve 7 is searched from a map.

It is noted that the intake air quantity QL derived by conversion of A1 is sufficiently low as compared with an actually derived predicted intake air quantity.

In a step S53, the CPU of the control unit 23 compares the intake air quantity QL with an actual intake air quantity Q detected by the airflow meter 9.

If the actual intake air quantity Q is less than the predicted intake air quantity QL by a predetermined value α, the routine goes to a step S54 in which the CPU determines that the second throttle valves 11a through 11d have failed and issues a warning signal to an indicator installed, e.g., on an instrument panel.

That is to say, although such a case occurs that, in the traction control, the actually sucked air quantity is remarkably reduced with respect to the predicted intake air quantity from the opening angle of the first throttle valve 7 in order to remarkably reduce the output derived by the first throttle valve 7, the intake air quantity is not largely reduced as compared with that in the case of the traction control when the traction control is not carried out. When the actually derived intake air quantity Q with respect to the opening angle of the first throttle valve 7 is remarkably minor, such an abnormal state that any or all of the second throttle valves 11a through 11d can be predicted in which the second throttle valves 11a through 11d are adhered (stuck to the corresponding wall of the intake port) to opening angles smaller than the desired opening angles.

Figure 6:
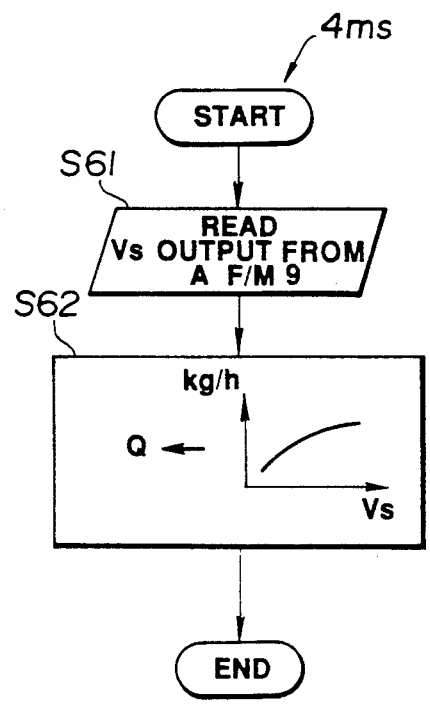
FIG. 6 is a fifth operational flowchart executed by the engine control unit of the intake air sucking apparatus shown in FIG. 1.

The actually predicted intake air quantity Q is derived in a program flowchart shown in FIG. 6.

That is to say, FIG. 6 shows the program flowchart executed whenever a predetermined period of time is elapsed.

In a step S61, the CPU of the control unit 23 converts the voltage signal output from the airflow meter 9 corresponding to the intake air quantity Q into the digital signal. Next, the A/D converted digital value is used to search the actually predicted intake air quantity Q from a map in a step S62.

In the preferred embodiment, when cut-outs are provided on the second throttle valves 11a through 11d as denoted by dot marks on the second throttle valves 11a through 11d shown in FIG. 1, and the opening area of the second throttle valves 11a through 11d is throttled, the swirl may be generated by introducing the air through the cut-outs. When the second throttle valves 11a through 11d are open according to the open operation of the first throttle valve 7, the quantity of swirl can be increased according to the increase in the engine load.

In the preferred embodiment, the first throttle valve 7 is installed at the upstream portion of the intake manifold 4. An acceleration sensor 30, which detects an operating variable of an accelerator pedal 6 as acceleration depression quantity, may be installed, and the basic opening angle of the second throttle valves 11a through 11d may be determined on the basis of the depression quantity detected by the acceleration sensor 30. In the alternative, the first throttle valve 7 is not necessary. However, for the fail-safe structure, the structure in which first throttle valve 7 and second throttle valves 11a through 11d are installed may be preferable.

Furthermore, although in the preferred embodiment both the second throttle valves 11a through 11d and bypass intake air quantity control valve 16 serve to handle the output control requirements, only the bypass intake airflow quantity control valve 16 may serve to control the engine idling speed and only the second throttle valves 11a through 11d may serve to carry out the traction control. In this way, either of the bypass intake air quantity control valve 16 or second throttle valves 11a through 11d may be used for each output control requirement.

The present invention can be applied equally well to the engine having a multiple number of engine cylinders.

As described above, the second throttle valves are installed in the respective intake ports of the intake manifold whose opening angle is controlled by means of the actuator, i.e., motor in response to the control signal derived from the control unit 23. Therefore, since the intake air quantity is controlled by means of the second throttle valves located near to the respective combustion chambers, the intake air quantity can be controlled with a fast responsive characteristic.

If the cut-outs (dot marks in the second throttle valves 11a through 11d in FIG. 1) are provided on the respective throttle valves and the intake air is sucked via the cut-outs into each combustion chamber, the preferable swirl is generated in each combustion chamber when the engine load is light. In this case, it is possible to increase the swirl quantity according to the opening angle of the second throttle valves and engine load.

Since the bypass passage is connected to each intake port downstream of the second throttle valve, the intake air during low engine load can be introduced via the bypass passage.

In addition, since the fuel injection valves are installed in the exits of the branched bypass passages located adjacent to the intake ports, almost all fuel injected from the fuel injection valves can be atomized in an air stream having a high stream speed by means of the throttled branched bypass passages with respect to the intake ports.

Since the intake air quantity supplied into the engine cylinders is controlled by means of the bypass intake air quantity control valve, the quantity of swirl can be controlled according to the engine load on the basis of which the bypass intake air quantity control valve is controlled. The engine idling speed can be controlled by means of the bypass intake air quantity control valve so as to feedback control the engine idling speed to coincide with the target idling speed (and/or by means of the second throttle valves).

In the feedback control of the engine idling speed, by means of the bypass intake air quantity control valve or second throttle valves, since the intake air passed through each valve is sucked into each engine cylinder and does not pass through a collector portion of the intake manifold as an air expanding portion, the engine idling can be controlled with a fast responsive characteristic.

If the differential value of the actual engine revolutional speed is used in the engine idling speed control by means of the second throttle valves and/or by means of the bypass intake air quantity control valve in addition to the deviation of the actual engine revolution speed from the target engine idling speed, the converging characteristic of the opening angle control to the variation in the engine idling speed can be improved.

Since the engine output control to recover the traction and relieve the shift shock during the gear range shift operation of the power transmission is carried out via the second throttle valves and/or bypass intake air quantity control valve, the responsive characteristic of the engine output can be improved.

Furthermore, the engine revolution variation can be suppressed with the first-order differential value of the engine revolutional speed (acceleration) settled at a constant value since the opening angle of the second throttle valves and/or bypass intake air quantity control valve is controlled in a direction in which the second-order differential value of the engine revolutional speed is varied with zero as a center.

The apparatus for controlably sucking intake air into each cylinder of the internal combustion engine which is mounted in the vehicle and connected to the power transmission and a method for controlling the intake air quantity according to the present invention have various other advantages.

As described hereinabove, since the apparatus for controllably sucking intake air to each cylinder of the internal combustion engine and the method for controlling the intake air quantity according to the present invention can control the engine intake air quantity with a fast responsive characteristic to the engine output control requirement without being correlated to the acceleration operation, the control responsive characteristic such as the idling speed control, traction control, and so on, can be remarkably improved. Particular, the surge absorption control can be improved and the ability to drive under a condition wherein a leaner air/fuel mixture ratio is used (a condition under which surge is easy to occur) becomes possible (thus, lower fuel consumption can be achieved).

It will fully be appreciated by those skilled in the art that the foregoing description has been made in terms of the preferred embodiment, and various changes and modifications may be made without departing from the scope of the present invention which is to be defined by the appended claims.

What is claimed is:

1. An apparatus for an internal combustion engine having a number of engine cylinders comprising:
   a) an intake manifold having a plurality of branched intake ports associated with intake valves of the respective engine cylinders for defining an intake air passage;
   b) a first throttle valve, associated with an accelerator element, for controllably opening and closing the intake air passage, the first throttle valve being controlled in accordance with an operation on the accelerator element and being installed on an upstream portion of the intake manifold;

c) a plurality of second throttle valves, installed on the intake ports of the intake manifold, each having an opening angle which is controlled by means of an actuator in response to a control signal input thereto;

d) a bypass passage including a plurality of branched bypass passages at an intermediate portion of the bypass passage, one end of the bypass passage being connected to the intake air passage upstream of the first throttle valve and one end of each of the branched bypass passages being connected to the intake ports downstream of the second throttle valves; and e) a plurality of fuel injection valves intervened at predetermined portions within the branched bypass passages adjacent to the intake ports, respectively.

2. An apparatus as set forth in claim 1, which further includes a bypass intake air quantity control valve installed in the bypass passage for controlling an intake air quantity which is passed through the bypass passage into the respective engine cylinders.

3. An apparatus as set forth in claim 2, wherein the bypass passage is constructed such that the intake air passed through the bypass intake air quantity control valve is introduced into the respective engine cylinders in a form of swirl stream.

4. An apparatus as set forth in claim 3, which further includes a fifth control means for controlling the opening angle of at least one of the second throttle valves and bypass quantity intake air control valve so that the intake air quantity in the form of swirl is controlled according to an engine load and third means for detecting the engine load.

5. An apparatus for an internal combustion engine having a number of engine cylinders comprising:

a) an intake manifold having a plurality of branched intake ports associated with intake valves of the respective engine cylinders for defining an intake air passage;

b) a first throttle valve, associated with an accelerator element, for controllably opening and closing the intake air passage, the first throttle valve being controlled in accordance with an operation on the accelerator element and being installed on an upstream portion of the intake manifold;

c) a plurality of second throttle valves, installed on the intake ports of the intake manifold, each having an opening angle which is controlled by means of an actuator in response to a control signal input thereto;

d) a plurality of branched bypass passages at an intermediate portion of the bypass passage, one end of the bypass passage being connected to the intake air passage upstream of the first throttle valve and one end of each of the branched bypass passages being connected to the intake ports downstream of the second throttle valves;

e) a plurality of fuel injection valves intervened at predetermined portions within the bypass passages adjacent to the intake ports, respectively;

f) a bypass intake air quantity control valve, installed in the bypass passage, for controlling an intake air quantity which is passed through the bypass passage into the respective cylinders, g) first control means, associated with the bypass intake air quantity control valve, for controlling an opening angle of the bypass intake air quantity control valve so that an engine idling speed coincides with a target idling speed; and h) first sensing means for detecting an engine revolution speed and second sensing means for detecting whether the engine falls in the engine idling condition;

wherein the bypass passage is constructed such that the intake air passed through the bypass intake air quantity control valve is introduced into the respective engine cylinders in a form of swirl stream.

6. An apparatus as set forth in claim 5, which further includes second control means associated with the second throttle valves for controlling a whole opening angle of the second throttle valves so that the engine idling speed coincides with the target engine idling speed.

7. An apparatus as set forth in claim 6, wherein the first and second control means are incorporated in a single control unit.

8. An apparatus as set forth in claim 6, wherein the first or second control means controls at least one of the opening angles of the corresponding bypass intake air quantity control valve and second throttle valves on the basis of a differential value of the engine revolution speed and a deviation of the actual engine revolution speed from the target idling speed.

9. An apparatus as set forth in claim 8, which further includes a third control means for controlling an engine output such that the opening angle of at least one of the second throttle valves and bypass passage intake air quantity control valve is controlled in accordance with a variation request for an engine output torque not correlated to an acceleration operation of the accelerator element.

10. An apparatus as set forth in claim 9, which further includes a fourth control means for controlling the opening angle of at least one of the second throttle valves and bypass passage intake air quantity control valve in a direction in which the opening angle thereof is controlled so as to suppress a variation of a second-order differential value of the engine revolutional speed with zero value thereof as a center.

11. An apparatus as set forth in claim 10, wherein the third sensing means includes an airflow meter installed in the intake passage upstream of the first throttle valve for detecting the intake air quantity of the engine, and which further includes fourth sensing means for detecting the opening angle of the first throttle valve, and a sixth control means for determining whether the intake air quantity detected by the third sensing means is below a predetermined quantity which is determined according to the opening angle of the first throttle valve and for informing that the second throttle valves fail when the intake air quantity detected by the third sensing means is not below the predetermined quantity.

12. An apparatus as set forth in claim 11, which further includes a fourth sensing means for detecting an operating variable of the accelerator element, and a seventh control means for controlling a basic opening angle of the second throttle valves on the basis of the operating variable of the accelerator element detected by the fourth sensing means in place of the first throttle valve.

13. A controlling apparatus for an internal combustion engine, comprising:

a first throttle valve associated with an accelerator element for controllably opening and closing an intake air passage of the engine, the first throttle valve being controlled in accordance with an operation on the accelerator element and being installed on an upstream portion of the intake manifold;

a plurality of second throttle valves, installed on the intake ports of the intake manifold, each having an opening angle which is integrally controlled by means of an actuator in response to a control signal input thereto;

a bypass passage having a plurality of branched bypass passages at an intermediate portion of the bypass passage, one end of the bypass passage being connected to the intake air passage upstream of the first throttle valve and one end of each of the branched bypass passages being connected to the intake ports downstream of the second throttle valves;

a bypass intake quantity control valve intervened in the bypass passage for controlling the intake air quantity which is passed through the bypass passage in response to another control signal input thereto;

a first sensor for monitoring a camshaft rotation and for producing a reference crank angle signal whenever a piston of each cylinder reaches a top dead center;

first means for deriving and updating a TDC period whenever the reference crank angle signal is received;

second means for deriving an engine revolution speed on the basis of the TDC period, for deriving a two-order differential value of the engine revolutional speed, and for deriving a determination value to determine whether a surge of a vehicle body in which the engine is mounted occurs on the basis of the differential value of the engine revolution speed; and third means for producing and outputting the control signal to at least one of the actuator and bypass intake air quantity control valve for controlling the opening angle of at least one of the second throttle valve and bypass intake air quantity control valve so as to make zero the two-order differential value of the engine revolution speed.

14. A controlling apparatus as set forth in claim 13, which further includes a second sensor for detecting the opening angle of the first throttle valve, a third sensor for detecting the opening angle of the second throttle valves, fourth means for deriving a first correction coefficient ($\Delta S1$) for the opening angle of the second throttle valves and a second correction coefficient ($\Delta Z1$) for the opening angle of the bypass intake quantity control valve on the basis of the determination value; fifth means for deriving a basic opening angle (S0) of the second throttle valves according to an opening area (A1) of the first throttle valve derived on the basis of the detected opening angle of the first throttle valve and for deriving a basic opening angle (Z0) of the bypass intake air quantity control valve on the basis of the opening area of the first throttle valve, and within the third means outputs the control signals to the actuator and bypass intake air quantity control valve, respectively, according to the basic opening angle plus first or second correction coefficient (S0+$\Delta S1$, Z0+$\Delta Z1$).

15. A controlling apparatus as set forth in claim 14, which further includes a fourth sensor for detecting a revolution speed of a driven wheel. a fifth sensor for detecting a revolution speed of a non-driven wheel, sixth means for deriving an absolute difference between the revolution speeds of the driven wheel and non-driven wheel, and seventh means for deriving a third correction coefficient ($\Delta S2$) for the opening angle of the second throttle valves on the basis of the absolute difference and for deriving a fourth correction coefficient ($\Delta Z2$) for the opening angle of the bypass intake air quantity control valve.

16. A controlling apparatus as set forth in claim 15, which further includes eighth means for determining whether a gear range of a power transmission associated with the engine is shifted and ninth means for deriving a fifth correction coefficient ($\Delta S3$) for the opening angle of the second throttle valves when the gear range is shifted and for deriving a sixth correction coefficient ($\Delta Z3$) for the opening angle of the bypass intake air quantity control valve when the gear range is shifted, the fifth and sixth correction coefficients being predetermined values when the gear range is shifted.

17. A controlling apparatus as set forth in claim 16, which further includes a sixth sensor for detecting whether the engine falls in an engine idling condition: tenth means for deriving a seventh correction coefficient ($\Delta S4$) for the opening angle of the second throttle valves and an eighth correction coefficient ($\Delta Z4$) for the opening angle of the bypass intake air quantity control valve, both the seventh and eight, correction coefficients being derived on the basis of a deviation of the engine idling speed from a target idling speed and a differential value of the engine idling speed when the engine falls in the engine idling condition.

18. A controlling apparatus as set forth in claim 17, wherein both the seventh and eighth correction coefficients are set to zero when the engine does not fall in the idling condition.

19. A controlling apparatus as set forth in claim 18, which further includes eleventh means for determining whether the gear range of the power transmission is placed in a reverse range and twelfth means for setting the opening angle of the bypass intake quantity control valve to zero and for setting the opening angle of the second throttle valves to a predetermined opening angle when the gear range is placed in the reverse range.

20. A controlling apparatus as set forth in claim 18, which further includes thirteenth means for deriving a ninth correction coefficient ($\Delta S0$) for the opening angle of the second throttle valves according to a difference between both opening areas of the second throttle valves and first throttle valve (A1−A2) and for deriving a tenth correction coefficient ($\Delta Z0$) for the opening angle of the bypass intake air quantity control valve according to the difference between both opening areas of the first and second throttle valves.

21. A controlling apparatus as set forth in claim 20, which further includes fourteenth means for deriving the opening angle of the second throttle valves (S) on the basis of the following expression: S←S0+$\Delta S1$−$\Delta S2$−$\Delta S3$+$\Delta S4$−$\Delta S0$ and deriving the opening angle of the bypass intake air quantity control valve on the basis of the following expression: Z←Z0+$\Delta Z1$−$\Delta Z2$−$\Delta Z3$+$\Delta Z4$−$\Delta Z0$, both opening angles of the second throttle valves and bypass intake air quantity being controlled according to the values of S and Z.

22. A controlling apparatus as set forth in claim 21, which further includes fifteenth means for determining whether the opening area of the first throttle valve is equal to or below a predetermined value which corresponds to a minimum opening area of the second throttle valves when the second throttle valves are completely closed and wherein the fourteenth means sets the opening angle (S) of the second throttle valves to zero.

23. A controlling apparatus as set forth in claim 22, wherein the actuator includes a servo motor and a spring mechanism, the spring mechanism biasing the second throttle valves in a completely open direction so that when the second throttle valve fails, the second throttle valves are in the complete open position.

24. A method for controlling an internal combustion engine, comprising the steps of:
    a) providing a plurality of auxiliary throttle valves in intake ports branched from an intake manifold in addition to a first throttle valve installed in an upstream portion of the intake manifold;
    b) providing a bypass passage between an intake air passage upstream of the first throttle valve and the intake ports and a bypass intake air quantity control valve intervened in the bypass passage;
    c) controlling at least one of an opening angle of the auxiliary throttle valves and the bypass intake air control valve to control an intake air quantity supplied to the engine;
    d) detecting if the engine is in an idling condition;
    e) detecting the engine revolution speed; and
    f) controlling an opening angle of the bypass intake air control valve so that the engine idling speed is changed to coincide with a target idling speed.

25. An apparatus for an internal combustion engine having a number of engine cylinders comprising:
    a) an intake manifold having a plurality of branched intake ports associated with intake valves of the respective engine cylinders for defining an intake air passage;
    b) a first throttle valve, associated with an accelerator element, for controllably opening and closing the intake air passage, the first throttle valve being controlled in accordance with an operation on the accelerator element and being installed on an upstream portion of the intake manifold;
    c) a plurality of second throttle valves, installed on the intake ports of the intake manifold, each having an opening angle which is controlled by means of an actuator in response to a control signal input thereto;
    d) a bypass passage including a plurality of branched bypass passages at an intermediate portion of the bypass passage, one end of the bypass passage being connected to the intake air passage upstream of the first throttle valve and one end of each of the branched bypass passages being connected to the intake ports downstream of the second throttle valves; and
    e) a plurality of fuel injection valves intervened at predetermined portions within the bypass passages adjacent to the intake ports, respectively;
    wherein each second throttle valve is provided with a cut-out for generating a swirl in the intake air sucked into each engine cylinder.

* * * * *